(12) United States Patent
Hikida

(10) Patent No.: US 8,160,378 B2
(45) Date of Patent: Apr. 17, 2012

(54) APPARATUS, METHOD AND SYSTEM FOR IMAGE PROCESSING

(75) Inventor: Satoshi Hikida, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 715 days.

(21) Appl. No.: 12/320,615

(22) Filed: Jan. 30, 2009

(65) Prior Publication Data

US 2009/0196522 A1 Aug. 6, 2009

(30) Foreign Application Priority Data

Feb. 4, 2008 (JP) ................................ 2008-023627

(51) Int. Cl.
G06K 9/40 (2006.01)

(52) U.S. Cl. ........ 382/255; 382/260; 382/274; 382/275; 358/3.26; 358/3.27; 358/463

(58) Field of Classification Search .................. 382/260, 382/274, 275; 358/3.26, 3.27, 463
See application file for complete search history.

(56) References Cited

U.S. PATENT DOCUMENTS

| | | | |
|---|---|---|---|
| 7,027,087 B2 | 4/2006 | Nozaki et al. | |
| 7,488,237 B2 * | 2/2009 | Saitoh | 451/44 |
| 7,688,368 B2 * | 3/2010 | Kijima et al. | 348/272 |
| 7,714,887 B2 * | 5/2010 | Nobori et al. | 348/148 |
| 7,746,470 B2 * | 6/2010 | Engelhardt | 356/365 |
| 2003/0193610 A1 | 10/2003 | Nozaki et al. | |
| 2006/0023076 A1 | 2/2006 | Jeoung | |
| 2006/0132623 A1 | 6/2006 | Nozaki et al. | |
| 2009/0091633 A1 | 4/2009 | Tamaru | |

FOREIGN PATENT DOCUMENTS

| | | |
|---|---|---|
| EP | 2 007 135 | 12/2008 |
| JP | 05-060528 | 3/1993 |
| JP | 10-142490 | 5/1998 |
| JP | 2004-135029 | 4/2004 |
| JP | 3630965 | 12/2004 |
| JP | 2006-295242 | 10/2006 |
| JP | 2006-311340 | 11/2006 |
| JP | 2009-094725 | 4/2009 |

OTHER PUBLICATIONS

English language Abstract of JP 11-183787 dated Jul. 9, 1999.
European Search Report dated Jun. 24, 2010 issued in corresponding European Application No. 09250274.9.
Japanese Office Action dated Oct. 18, 2011 issued in corresponding Japanese Application No. 2008-023627.

* cited by examiner

Primary Examiner — Yosef Kassa
(74) Attorney, Agent, or Firm — Harness, Dickey & Pierce, PLC

(57) ABSTRACT

An apparatus, method, and system for image processing are provided, each capable of consecutively capturing a plurality of images of an object, and selecting a mostly focused image from the plurality of images while compensating for the shift in the position of the object among the plurality of images.

15 Claims, 11 Drawing Sheets

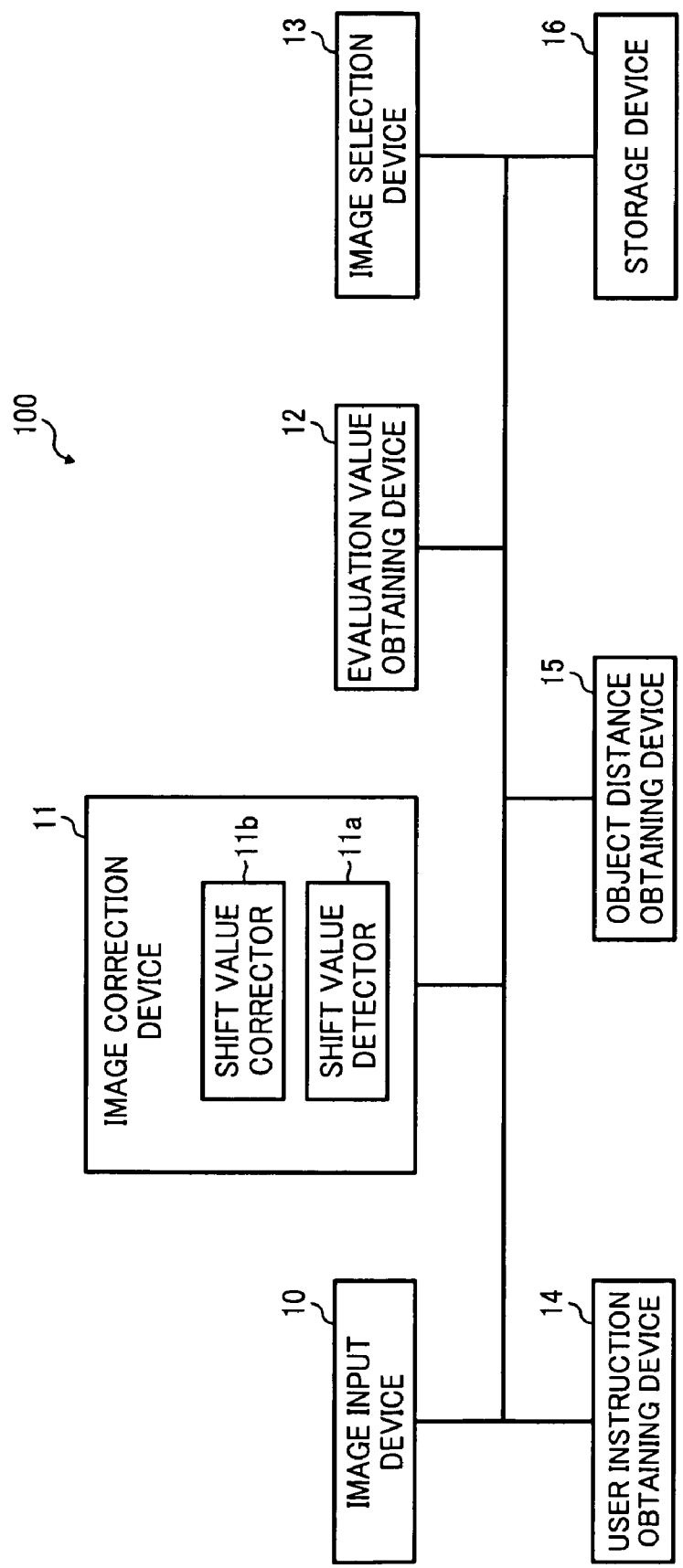

| MOTOR PULSE VALUE | ENLARGE/REDUCE RATIO |
|---|---|
| 124 | 1.03 |
| 140 | 1.05 |
| 156 | 1.08 |
| ⋮ | ⋮ |

APPARATUS, METHOD AND SYSTEM FOR IMAGE PROCESSING

CROSS-REFERENCE TO RELATED APPLICATIONS

This patent application is based on and claims priority under 35 U.S.C. §119 to Japanese Patent Application No. 2008-023627, filed on Feb. 4, 2008, in the Japanese Patent Office, the disclosure of which is hereby incorporated herein by reference.

FIELD OF THE INVENTION

The present invention generally relates to an apparatus, method, and system for image processing, and more specifically to an apparatus, method, and system for image processing capable of consecutively capturing a plurality of images of an object, and selecting a mostly focused image from the plurality of images while compensating for the shift in the position of the object among the plurality of images.

BACKGROUND

Recently, a photographing device such as a digital camera is widely used, which is capable of taking an image of an object as digital data. In order to take an image, a user usually presses a release shutter button of the digital camera halfway to focus the object, and continues to press the release shutter button all the way to take the image after the object is focused. Focusing the image in this way has been difficult for some users such that the resultant image may be out of focus.

In view of the above, the digital camera may be provided with the function of consecutively capturing a plurality of images of the same object while changing the focal position and automatically selecting an image that is mostly focused or allowing the user to select an image that is mostly focused based on the evaluation value being calculated for each image, for example, as described referring to Japanese Patent Application Publication No. 2004-135029.

SUMMARY

However, the inventor of the present invention has observed that selecting the mostly focused image based on the evaluation value is not appropriate unless the focus evaluation value correctly reflects a specific portion of the image, which has been selected for evaluation. In reality, when a plurality of images are taken at different focal lengths, the position of the specific portion in the image may be shifted due to the change in focal length of the optical system, thus causing the evaluation value to be inaccurate for some images. Further, the position of the specific portion in the image may be shifted due to the movement of the user's hand holding the digital camera, thus causing the evaluation value to be inaccurate for some images.

In view of the above, example embodiments of the present invention include an image processing apparatus provided with a processor. The processor may input a plurality of images of an object, the plurality of images being consecutively captured by an optical system while changing a focal length of the optical system for each image; obtain, for each image of the plurality of images, an evaluation value indicating how much an object area of the object in each image is focused; obtain, for each image of the plurality of images, information regarding a shift value indicating the shift in position of the object area of the object in each image with respect to a reference point; generate a corrected evaluation value, the corrected evaluation value being compensated for the shift value being obtained for each image; and select an image having a mostly focused object area based on the corrected evaluation value as a mostly focused image.

Example embodiments of the present invention include an image processing system provided with a processor capable of performing the above-described functions, and a photographing device provided with the optical system that captures the plurality of images.

Example embodiments of the present invention include an image processing method, which includes: inputting a plurality of images of an object, the plurality of images being consecutively captured by an optical system while changing a focal length of the optical system for each image; obtaining, for each image of the plurality of images, an evaluation value indicating how much an object area of the object in each image is focused; obtaining, for each image of the plurality of images, information regarding a shift value indicating the shift in position of the object area of the object in each image with respect to a reference point; generating a corrected evaluation value, the corrected evaluation value being compensated for the shift value being obtained for each image; and selecting an image having a mostly focused object area based on the corrected evaluation value as a mostly focused image.

In addition to the above-described example embodiments, the present invention may be practiced in various other ways, for example, as a storage medium storing a plurality of instructions which cause a processor to perform the above-described image processing operation.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 4 is a schematic block diagram illustrating a functional structure of an image processing apparatus, according to an example embodiment of the present invention;

Figure 1:
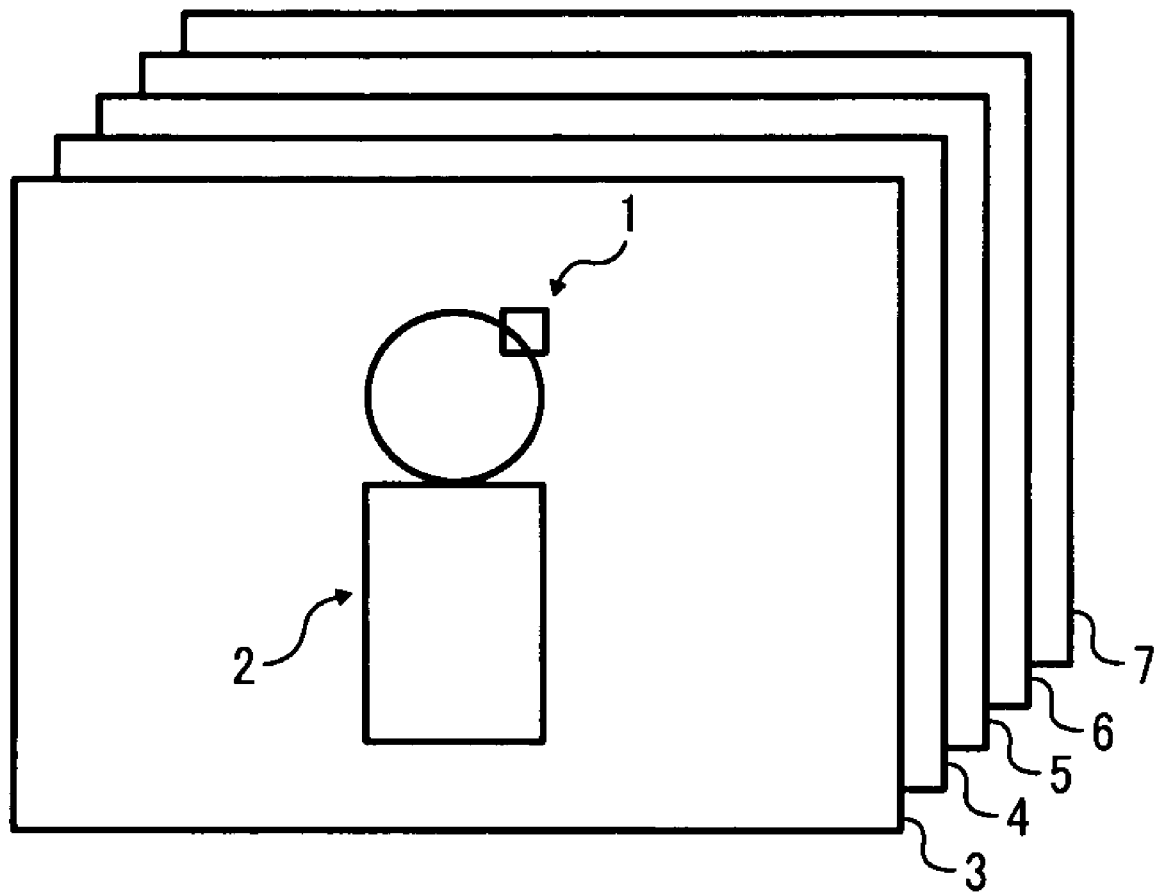
FIG. 1 is an illustration for explaining a plurality of images of an object, which are consecutively taken by an optical system while changing the focal length of the optical system, according to an example embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION OF EXAMPLE EMBODIMENTS

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

Referring now to FIG. 4, an example structure of an image processing apparatus 100 is explained according to an example embodiment of the present invention. The image processing apparatus 100 is capable of consecutively capturing a plurality of images of an object while changing a focal length of an optical system for each image, and automatically selecting an image in which the object is mostly focused or allowing the user to select an image in which the object is mostly focused.

The image processing apparatus 100 includes an image input device 10, an image correction device 11, an evaluation value obtaining device 12, an image selection device 13, and a storage device 16.

The image input device 10 inputs a plurality of images of an object, which are consecutively taken by an optical system while changing the focal length of the optical system for each image. In this example, the optical system, which may be provided within or outside the image processing apparatus 100, includes a photographing lens system, a focus lens system, and an aperture system. Based on settings that may be previously set by default or according to the user preference, the optical system may consecutively capture a predetermined number of images, while changing the focal length of the optical system, for example, through changing driving operation of the focus lens system.

The evaluation value obtaining device 12 obtains an evaluation value for each image of the plurality of images being input by the image input device 10. The evaluation value indicates how much a specific object area in each image is focused. The specific object area may be previously set by default or according to the user preference such that the specific object area may be any area corresponding to a specific portion of the image.

In order to determine whether the image is in focus, the levels of the spatial frequency components of the image may be considered, as the focused image tends to have high spatial frequency components. For example, the evaluation value obtaining device 12 may be implemented by an auto focus (AF) detector, which detects the high spatial frequency components in the image or the object area of the image, and outputs the detection result as an AF value. The AF detector may include a high pass filter that passes the high spatial frequency components or a band-pass filter that passes the spatial frequency components having a predetermined value. The output of the filter may be integrated to obtain the AF value. The image having a high AF value is assumed to be the image that is in focus.

The image correction device 11 detects the shift in the position of the object area among the plurality of images, and obtains or causes the evaluation value obtaining device 12 to obtain the evaluation value for each image such that the shift in the position of the object area for each image is corrected.

The image selection device 13 selects an image having the mostly focused object area, from the plurality of images using the evaluation value for each image. For example, the image selection device 13 may select an image having the highest AF value as the mostly focused image.

The storage device 16 may store various data including, for example, the image selected by the image selection device 13 as a mostly focused image.

The image processing apparatus 100 may additionally include a user instruction obtaining device 14 and an object distance obtaining device 15.

The user instruction obtaining device 14 inputs a user instruction received from the user. In one example, the user instruction obtaining device 14 inputs a user instruction defining the object area of the object, and causes the evaluation value obtaining device 12 to obtain an evaluation value for the defined object area. The object distance obtaining device 15 obtains an object distance indicating the distance between the optical system and the object, using the focal length that corresponds to the mostly focused image selected by the image selection device 13.

In example operation, the image input device 10 inputs a plurality of images of an object, which are consecutively taken by the optical system while changing the focal length of the optical system, for example, as illustrated in FIG. 1. Referring to FIG. 1, in this example, it is assumed that five images 3, 4, 5, 6, and 7 are consecutively taken by the optical system for an object 2, and obtained by the image input device 10. Still referring to FIG. 1, an object area 1 of the object 2 shown in the image 3 may be selected by default, or according to the user preference input through the user instruction obtaining device 14. In this example, the storage device 16 may store information indicating the position of the object area 1 as setting data.

Further, in this example, while the reference numeral 2 points the figure provided at the center of the image 3 as the object 2, the object 2 may correspond to any object taken by the optical system including the object shown in the background section of the image.

The evaluation value obtaining device 12 obtains an evaluation value for each of the images 3 to 7, which indicates how much the object area 1 is focused. The image selection device 13 selects, from the images 3 to 7, an image in which the object area 1 is mostly focused based on the evaluation value obtained by the evaluation value obtaining device 12 for each image. The selected image may be stored in the storage device 16 as the mostly focused image. The mostly focused image may be output, for example, for display to the user. Additionally, the object distance obtaining device 15 may obtain an object distance using the mostly focused image. The object distance being obtained may be provided to any desired device for further processing or for display to the user.

In this example, since the images 3 to 7 are taken at different focal lengths, the size of the object may vary among the images 3 to 7 such that the position of the object area 1 in the image area may differ among the images 3 to 7. More specifically, when the size of the object 2 varies, the distance of the object area 1 with respect to a reference point, such as the center of the image area, varies among the images 3 to 7. For example, as the size of the object 2 increases, the distance between the object area 1 and the reference point in the image area increases. As the size of the object 2 decreases, the distance between the object area 1 and the reference point in the image decreases.

Figure 2A:
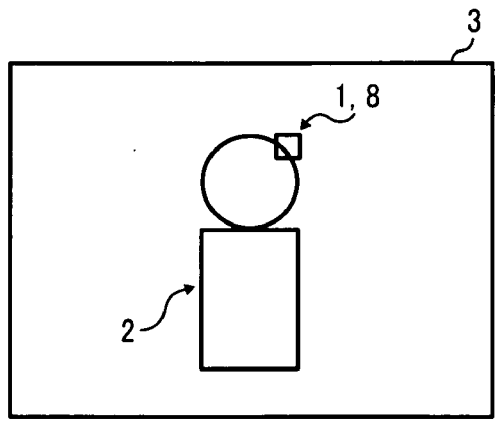
FIG. 2A is an illustration for explaining one image selected from the plurality of images shown in FIG. 1.
Figure 2B:
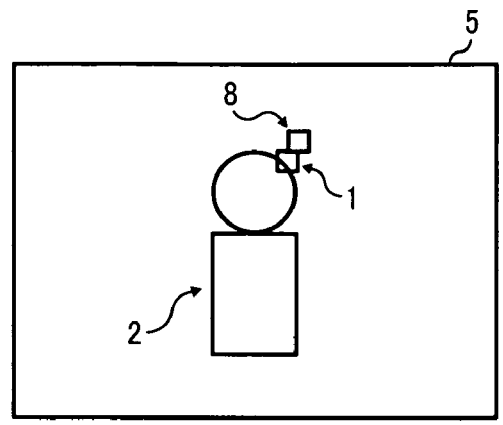
FIG. 2B is an illustration for explaining one image selected from the plurality of images shown in FIG. 1, which is different from the image of FIG. 2A.

For example, as illustrated in FIGS. 2A and 2B, the position of the object area 1 in the image 3 and the position of the object area 1 in the image 5 differ in the image area as the size of the object 2 varies between the image 3 and the image 5. When the position of the object area 1 shifts between images 3 and 5, the evaluation value obtaining device 12 may not be able to correctly obtain the evaluation value for the object area 1 as the evaluation value obtaining device 12 needs to accurately define the position of the object area 1 in each image.

For example, referring to FIG. 2A, it is assumed that the user sets the object area 1 to be at the position in the image 3 indicated by the square 8. In this example, the square 8 of FIG. 2A indicates an evaluation area to be used by the image processing apparatus 100 for evaluation, which may be stored in the storage device 16 as setting data. In such case, the evaluation value obtaining device 12 obtains the evaluation value for the object area 1 of the image 3, which is positioned at the square 8. In the example case illustrated in FIG. 2B, as the position of the square 8 does not match the position of the object area 1 in the image 5, the evaluation value obtained by the evaluation value obtaining device 12 does not reflect the object area 1 in the image 5. As the evaluation value is not obtained for the object area 1 for all images 3 to 7, the image selection device 13 is not able to select an image having the mostly focused object area 1.

In view of the above, the image correction device 11 is provided, which detects the shift in the position of the object area 1 among the images 3 to 7, which is caused due to the change in focal length of the optical system when taking each one of the images 3 to 7. As illustrated in FIG. 4, the image correction device 11 includes a shift value detector 11a and a shift value corrector 11b. The shift value detector 11a obtains, for each of the images 3 to 7, information indicating how much the object area 1 is shifted among the plurality of images 3 to 7, such as the shift value indicating the actual distance in which the object area 1 is shifted or any value indicating the degree of shift in the position of the object area 1. The shift value corrector 11b obtains, or causes the evaluation value obtaining device 12 to obtain, the evaluation value while compensating for the shift in the position of the object area 1 such that the evaluation value for the object area 1 is accurately obtained for each image.

In one example, the shift value detector 11a may obtain, for each one of the images 3 to 7, the distance between the object area 1 and a reference point, and uses the obtained distance value to have information regarding how much the position of the object area 1 is shifted among the images. For example, referring back to FIG. 2A, the shift value detector 11a may set the image 3 as a reference image, and obtains the distance between the object area 1 and the reference point such as the center of the image 3 as a reference distance value. Referring to FIG. 2B, in order to obtain the shift value for the image 5 with respect to the reference image, the shift value detector 11a may obtain the distance between the object area 1 and the reference point as a distance value of the image 5, and calculate the difference between the distance value obtained from the image 5 and the reference distance value obtained from the image 3. The shift value of the object area 1 for each image may be expressed in the number of pixels corresponding to the difference in the distances, or the ratio indicating the difference in the distances.

In another example, when the object area 1 corresponds to the entire object 2, for each one of the images 3 to 7, the shift value detector 11a may obtain a plurality of distance values, each indicating the distance between a selected point of the object area 1 and a reference point. The shift value detector 11a may take the average of the plurality of distance values to obtain one distance value representing the image.

In another example, since the shift in the position of the object area 1 among the images is caused due to the difference in focal lengths specifically set for taking the images, the focal length for each image may be used as information indicating the shift value for each image. For example, when inputting the plurality of images, the image input device 10 may obtain information regarding the focal length of the optical system for each image, which may be obtainable from the optical system as a part of shooting condition information regarding the shooting condition for each image.

More specifically, in the following example illustrated in any one of FIGS. 6 to 13, the number of pulses of a driving device that drives the focus lens system provided in the optical system may be obtained for each image as the focal length for each image, as the focal length changes according to the number of motor pulses of the driving device that drives the focus lens system ("the motor pulse value"). For example, when inputting the plurality of images, the image input device 10 may obtain information regarding the motor pulse value for each image, which may be obtainable from the optical system as a part of shooting condition information regarding the shooting condition for each image.

Once the shift value, or information indicating the shift value, is obtained for each image, in one example, the shift value corrector 11b corrects the shift in the position of the object area 1 for each image such that the position of the object area 1 matches among the plurality of images 3 to 7.

For example, in order to correct the shift, the shift value corrector 11b enlarges or reduces the size of each image so as to cause the object area 1 to be the same size among the images, and causes the evaluation value obtaining device 12 to obtain the evaluation value for each image using the image that has been enlarged or reduced. The enlarge/reduce ratio, which is the ratio between the original image size and the enlarged/reduced image size, may be determined based on the shift value obtained by the shift value detector 11a or information indicating the shift value obtained by the shift value detector 11a, as the shift of the object area 1 is caused by the difference in object size among the images.

Figures 5, 6:
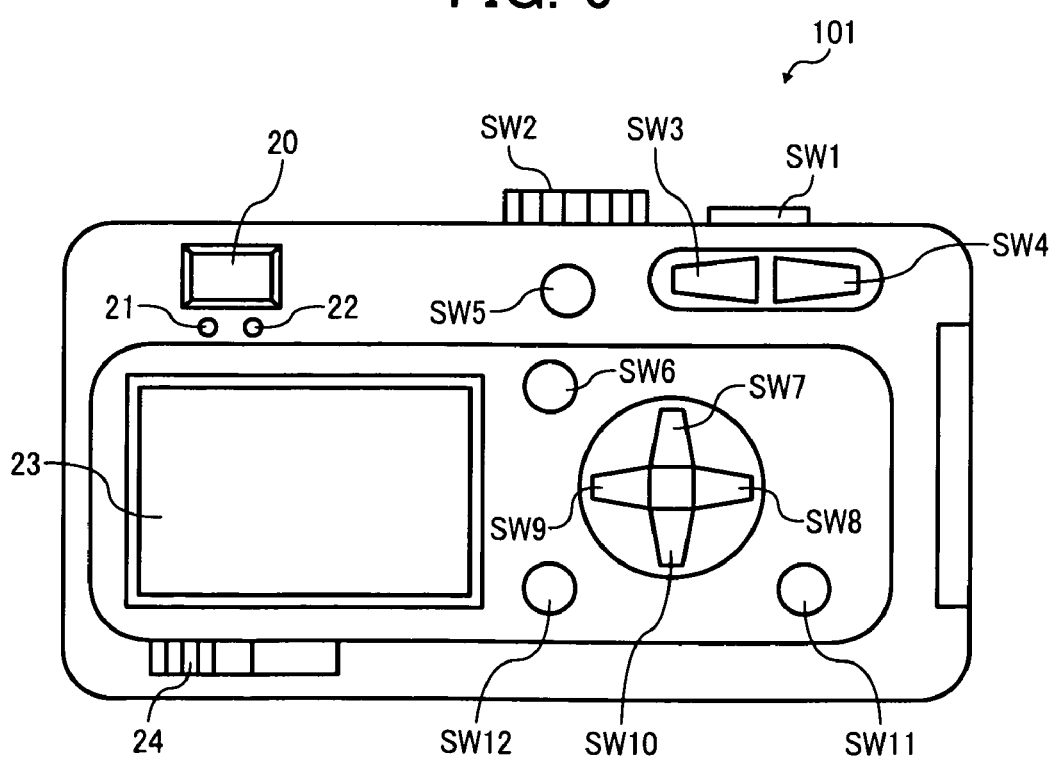
FIG. 5 is a table storing a plurality of motor pulse values of an optical system, and a plurality of enlarge/reduce ratio values being previously obtained with respect to the plurality of motor pulse values, according to an example embodiment of the present invention.
FIG. 6 is a view illustrating the back side surface of a digital camera functioning as the image processing apparatus of FIG. 4, according to an example embodiment of the present invention.

In this example, the storage device 16 may be provided with a table of FIG. 5, which stores information regarding the focal length such as the motor pulse value that changes proportionally to the focal length, and information regarding the enlarge/reduce ratio to be used for correcting the image that has been taken with the corresponding motor pulse value. The table of FIG. 5 indicates that, when the image corresponding to the motor pulse value of 124 is taken, the image is enlarged by the ratio of 1.03. In this example, the image corresponding to the motor pulse value of 100 is used as a reference image having the enlarge/reduce ratio of 1.00, which does not require enlargement or reduction. More specifically, the enlarge/reduce ratio of each image is determined with respect to the reference image. The table of FIG. 5 may be generated using any equation that describes the relationship between the motor pulse value and the enlarge/reduce ratio. Alternatively, the table of FIG. 5 may be generated by obtaining a sufficient number of samples, each being obtained by actual measurement regarding the enlargement or reduction of the image that can correct the shift value.

In alternative to the table of FIG. 5, the storage device 16 may be provided with information, which indicates the relationship between the motor pulse value and the enlarge/reduce ratio. For example, as illustrated in FIG. 5, the enlarge/reduce ratios increase as the motor pulse values increase. This relationship between the motor pulse value and the enlarge/reduce ratio may be expressed in any equation. Alternatively, such relationship may be expressed in any form such as in the form of graph.

In another example, the shift value corrector 11b may correct the evaluation value, which has been previously obtained by the evaluation value obtaining device 12 for each image that is not enlarged or reduced, such that the corrected evaluation value reflects the object area 1. More specifically, the shift value corrector 11b may calculate the corrected evaluation value using the evaluation value previously obtained for the original image and the enlarge/reduce ratio that corresponds to the shift value obtained by the shift value detector 11a.

The image selection device 13 selects a mostly focused image, using the evaluation value obtained for the image in which the shift in the position of the object area 1 is corrected or using the evaluation value that has been corrected to compensate for the shift in the position of the object area 1. As the shift in the position of the object area 1 is considered before making selection, the image selection device 13 is able to select an image that is mostly focused with increased accuracy. This improves the accuracy in selecting the image that is mostly focused especially when the image selection device 13 automatically selects the image for the user.

In addition to the shift caused due to the change in focal length of the optical system, the shift in the object area 1 among the plurality of images 3 to 7 may be caused due to the physical movement of the optical system. For example, when the optical system is incorporated into a digital camera functioning as the image processing apparatus 100, the optical system may move as the user's hand holding the digital camera moves, for example, at the time of capturing the images even when the time for capturing the images is relatively short.

Figure 3A:
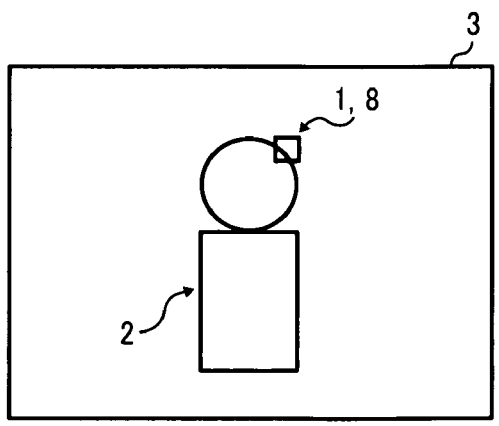
FIG. 3A is an illustration for explaining one image selected from the plurality of images shown in FIG. 1.
Figure 3B:
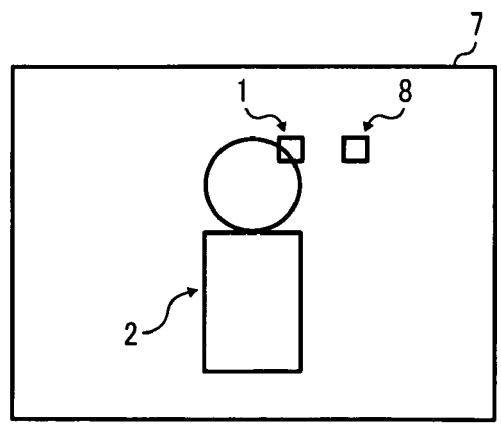
FIG. 3B is an illustration for explaining one image selected from the plurality of images shown in FIG. 1, which is different from the image of FIG. 3A.

For example, as illustrated in FIGS. 3A and 3B, the position of the object area 1 in the image 3 and the position of the object area 1 in the image 7 differ in the image area as the position of the digital camera with respect to the object 2 is shifted between the image 3 and the image 7. When the position of the object area 1 shifts between the images, the evaluation value obtaining device 12 may not be able to correctly detect the object area 1 for evaluation, as the position of the object area 1 with respect to the reference point differs among the plurality of images 3 to 7.

In view of the above, the image correction device 11 may further detect the shift in the position of the object area 1 among the images 3 to 7, which is caused due to the change in position of the optical system with respect to the object 2 when taking each one of the images 3 to 7. For example, referring to FIG. 4, the shift value detector 11a obtains, for each of the images 3 to 7, information regarding the shift value indicating the distance in which the object area 1 is shifted or any value indicating the degree of shift in the position of the object area 1. The shift value corrector 11b obtains, or causes the evaluation value obtaining device 12 to obtain, the evaluation value while compensating for the shift in the position of the object area 1 such that the evaluation value for the object area 1 is accurately obtained for each image. Alternatively, the image correction device 11 of FIG. 4 may only detect the shift in the position of the object area 1 among the images 3 to 7, which is caused due to the change in the position of the optical system with respect to the object 2 when taking each one of the images 3 to 7.

Further, in this example, once the mostly focused image is selected by the image selection device 15, the object distance obtaining device 15 may use the focal length that corresponds to the mostly focused image to obtain the object distance indicating the distance between the optical system and the object.

The image processing apparatus 100 of FIG. 4 may be implemented by any apparatus, which includes a processor capable of performing the above-described image processing operation according to an image processing program. For example, the image processing apparatus 100 of FIG. 4 may be implemented by a personal computer including a processor such as a microprocessor, and a memory including a read only memory (ROM), random access memory (RAM), etc. The memory may store therein an image processing control program, which causes the processor to function as the image processing apparatus of FIG. 4.

In example operation, the personal computer may receive a plurality of images that is consecutively taken by a photographing device such as a digital camera through an interface. At this time, information regarding the shooting condition such as information regarding the focal length may be obtained. Further, the evaluation value may be obtained, which may be calculated by the digital camera. In order to correct the shift in the object area 1 that is caused due to the change in focal length, the processor may obtain the enlarge/reduce ratio that corresponds to the obtained information regarding the focal length from a storage device that may be accessible by the processor, and correct the evaluation value using the obtained enlarge/reduce ratio. The corrected evaluation value may be used to select a mostly focused image from the plurality of images being obtained. Further, the mostly focused image may be used to obtain information regarding the object distance between the optical system and the object.

In another example operation, in order to correct the shift in the object area 1 that is caused due to the change in position of the digital camera with respect to the object 2, the processor may detect the shift value for each image being obtained, for example, using a motion detection circuit that functions as the shift value detector 11a, or using an image processing circuit capable of performing pattern matching and size reduction. Once the shift value and the evaluation value are obtained for each image, the processor may correct the evaluation value using the obtained shift value. The corrected evaluation value may be used to select a mostly focused image from the plurality of images being obtained. Further, the mostly focused image may be used to obtain information regarding the object distance between the optical system and the object.

In another example, the image processing apparatus 100 of FIG. 4 may be implemented by a multifunctional apparatus capable of performing a plurality of image processing operation including, for example, the operation of scanning, faxing, printing, copying, and communicating via a network, provided with a processor functioning as described above referring to FIG. 4.

Figure 7:
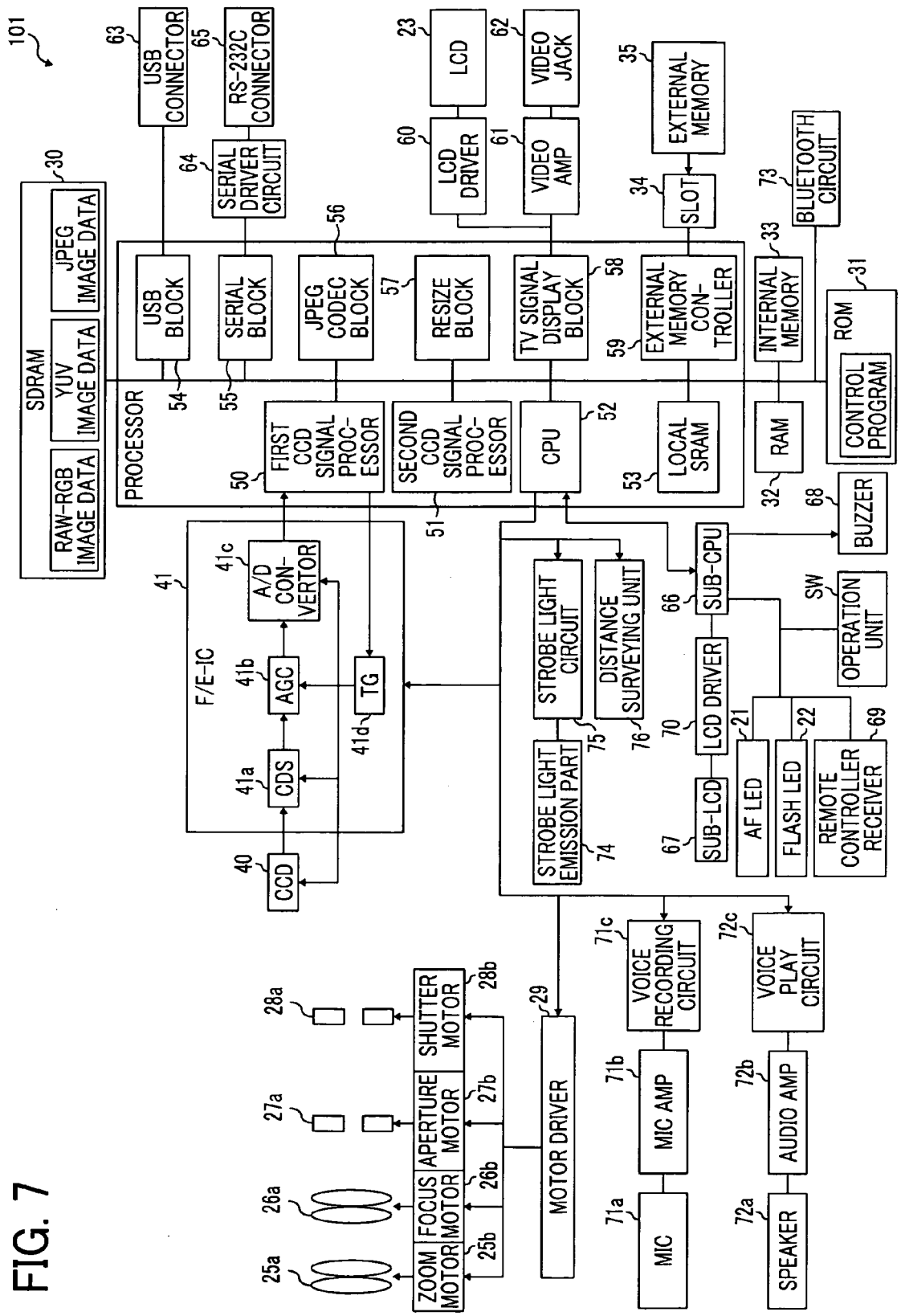
FIG. 7 is a schematic block diagram illustrating a hardware structure of the digital camera shown in FIG. 6.

In another example, the image processing apparatus 100 of FIG. 4 may be implemented by a personal assistance device (PDA) such as a mobile phone capable of taking an image, a digital camera, etc. Referring now to FIGS. 6 and 7, an example structure of a digital camera 101 functioning as the image processing apparatus 100 is explained according to an example embodiment of the present invention.

Referring to FIG. 6, the digital camera 101 includes a user interface for interaction with a user. For example, the digital camera 101 is provided with a shutter release button SW1, a mode dial SW2, a first zoom button SW3, a second zoom button SW4, a self timer button SW5, a menu button SW6, an up key SW7, a right key SW8, a left key SW9, a down key 10, a display button SW11, an OK button 12, an optical finder 20, an auto focus (AF) light emitting diode (LED) 21, a flash LED 22, a liquid crystal display (LCD) 23, and a power button 24.

The shutter release button SW1 allows the user to capture one or more images of an object. For example, the user may focus the object by pressing the shutter release button SW1 half way down, and capture the image of the object by pressing the shutter release button SW1 all the way down.

The mode dial SW2 allows the user to change the mode of the digital camera 101 such as a recording mode that allows the user to capture the image, a playback mode that allows the user to view the image being captured, etc.

The zoom buttons SW3 and SW4 allow the user to zoom in or out. The first zoom button SW3 allows the user to capture a wide-angle image. The second zoom button SW4 allows the user to capture a close-up image.

The self timer button SW5 allows the user to set a self timer to cause the digital camera 101 to capture the image after a predetermined time period.

The menu button SW6 displays a shooting menu on the LCD 23, which allows the user to set various settings regarding the shooting condition including, for example, the number of pixels to be recorded, the image compression rate that may be selected from the superfine image quality, the fine image equality, and the normal image quality, the exposure value adjustment, the light sensitivity such as the ISO value, the white balance value, the type of playback mode that may be selected from the single playback mode displaying one image at once, and the index playback mode displaying a plurality of images at once, etc.

The keys SW7 to SW10 allow the user to select an item on the shooting menu, or any other menu displayed through the LCD 23, for example, by moving a pointer displayed in the LCD 23 in any one of the up, right, left, and down direction according to the selection through the keys SW7 to SW10.

The display button SW11 allows the user to display various information such as the image being captured and the shooting menu on the LCD 23. The OK button SW12 allows the user to select the item of the shooting menu, which may be selected using the keys SW7 to SW10.

The optical finder 20 assists the user in capturing the image of the object. By looking through the optical finder 20, the user may have an idea of how the object is taken.

The AF LED 21 notifies the user whether the AF LED is turned on or off when shooting the image with auto focus. The flash LED 22 notifies the user whether the flash LED is turned on or off when shooting the image. Any one of the AF LED 21 and the flash LED 22 may be used to notify the user with other information, such as information regarding whether the digital camera 101 is accessing a memory card or any other kind of external memory.

The LCD 23 displays various information to the user including, for example, the object to be taken, the image being captured, and the shooting menu. The power button 24 allows the user to turn on or off the power of the digital camera 101.

Referring to FIG. 7, the digital camera 101 further includes an optical system provided with a lens system having a plurality of lens elements, which may be provided at the front side surface of the digital camera 101 as a camera cone, and an imaging device such as a charged coupled device (CCD) 40 and a front end (F/E) integrated circuit (IC) 41. The digital camera 101 of FIG. 4 further includes a central processing unit (CPU) 52 and a memory that works with the CPU 52, which together function as the image processing apparatus 100 of FIG. 4.

The lens system includes a zoom optical system including a zoom lens 25a and a zoom drive motor 25b that drives the zoom lens 25a, a focus optical system including a focus lens 26a and a focus drive motor 26b that drives the focus lens 26a, an aperture unit including an aperture 27a and an aperture motor 27b that drives the aperture 27a, a mechanical shutter unit including a mechanical shutter 28a and a mechanical shutter motor 28b that drives the mechanical shutter 28a, and a motor driver 29 that drives each of the motors 25b, 26b, 27b, and 28b. The zoom optical system causes the digital camera 101 to zoom in or out by varying the focal length of the zoom lens 25a. The focus optical system adjusts focusing. The aperture unit adjusts the intensity level of the light passing through the lens elements. The mechanical shutter unit adjusts the time or the light intensity level passing through the lens elements. The motor driver 29 is driven under control of the CPU 52, for example, according to a user instruction. As described above referring to FIG. 6, the user instruction may be input through any one of the buttons or keys SW1 to SW12, and 24 including the release shutter button SW1, the mode dial SW2, etc., which may be collectively referred to as an operation unit SW. Alternatively, the user instruction may be input through a remote controller receiver 69, which receives a signal sent from a controller provided remotely from the digital camera 101.

The CCD 40 converts the optical image, which is obtained by the lens system, to an electric signal such as analog image data. The F/E IC 41 includes a correlated double sampling (CDS) circuit 41a, an automatic gain control (AGC) circuit 41b, an analog digital (A/D) converter 41c, and a timing generator (TG) 41d.

The CDS 41a removes the noise in the analog image data, for example, by applying correlated double sampling (CDS) to the electric signal. For example, the CDS 41a obtains two sample data for the same electric signal output by the CCD 40 for a predetermined time period, and sets a peak value of the image signal based on the difference between the two sample data.

The AGC 41b adjusts the gain such that the output signal is maintained at the constant level. The gain may be used as a value indicating the ability of a circuit to increase the power or amplitude of a signal. The gain may be defined as the ratio of the voltage, current, or power of the signal output of a system to the voltage, current, or power of the signal input of the system.

The A/D converter 41c converts the image data from analog to digital. The TG 41d generates a timing signal, which is used to drive the CCD 40 and the F/E IC 41. The TG 41d may generate a timing signal, for example, according to a vertical synchronization signal VD and a horizontal synchronization signal HD each provided by the CPU 52.

The digital camera 101 further includes a storage device including a synchronous dynamic random access memory (SDRAM) 30, read only memory (ROM) 31, RAM 32, and internal memory 33, and a slot 34 to which an external memory 35 is inserted.

The SDRAM 30 stores one or more images that are taken by the optical system in any desired image format. For example, the SDRAM 30 may store the image data in a format specific to the digital camera 101 such as in the raw RGB image format. In another example, the image data may be stored in a YUV image format, with Y representing the brightness value, U indicating the difference value between the brightness value and the blue component value, and V indicating the difference value between the brightness value and the red component value. In another example, the image data may be stored in a JPEG format, or any other compressed image format for the still image.

The ROM 31 stores an image processing control program including a plurality of codes readable by the CPU 52, and various parameters to be used by the CPU 52 for performing operation according to the control program. For example, when the power button 24 is pressed to turn on the power of the digital camera 101, or the specific mode is selected through the operation unit SW, the image processing control program may be loaded from the ROM 31 onto a main memory to cause the CPU 52 and a memory accessible by the CPU 52 to have the functional structure of FIG. 4. Further, the CPU 52 causes each device in the digital camera 101 to operate according to the control program. Further, various data to be used for controlling operation may be stored in the RAM 32 or a local memory internally provided in a processor P such as a local SRAM 53 at least temporarily. The ROM 31 may be implemented by a flash ROM, which is rewritable. In such case, the control program or any parameter being stored in the ROM 31 may be updated, for example, when the version of the control program is changed.

Further, in this example, the image data may be stored in any desired memory or storage device other than the SDRAM 30. For example, the image data may be stored in the internal memory 33 or the external memory 35 being inserted into the slot 34. Examples of the external memory 35 include, but not limited to, a memory card, and a network interface card such as a local area network (LAN) card, a wireless LAN card, or a Bluetooth card.

As described above, the digital camera 101 is provided with the processor P including the CPU 52. The processor P further includes a first CCD signal processor 50, a second CCD signal processor 51, the local SRAM 53, a universal serial bus (USB) block 54, serial block 55, a JPEG CODEC block 56, a RESIZE block 57, a TV signal display block 58, and en external memory controller 59.

The first CCD signal processor 50 applies various image processing such as white balance adjustment or gamma processing to the image signal output by the F/E IC 41. The first CCD signal processor 50 may further supply the TG 41d with the vertical synchronization signal VD or horizontal synchronization signal HD. The second CCD signal processor 51 performs color conversion on the image signal by applying filtering to the image signal to obtain, for example, the brightness data and the color difference data.

The CPU 52 controls operation of each device provided in the digital camera 101. The local SRAM 53 at least temporarily stores various data to be used by the CPU 52 for controlling operation of the digital camera 101.

The USB block 54 allows communication with an external device such as a personal computer through the USB connection. The serial block 55 allows communication with an external device such as a personal computer through the serial connection. The JPEG CODEC block 56 applies JPEG compression or expansion to the image signal. The RESIZE block 57 changes the size of the image data, for example, by increasing or reducing the image data size by applying interpolation. The TV signal display block 58 converts the image signal to a video signal, which is to be displayed on a display device such as an LCD or a TV, which may be provided within or outside the digital camera 101. The external memory controller 59 controls the external memory 35, which may store the image data being captured by the digital camera 101.

In operation, the image data obtained from the CCD 40 through the F/E IC 41 is input to the first CCD signal processor 50. At the first CCD signal processor 50, various image processing is applied to the image data such as white balance adjustment or gamma processing to output the image data as raw RGB image data. The second CCD signal processor 51 converts the raw RGB image data to, for example, YUV image data to obtain brightness image data and color difference data. The JPEG CODEC block 56 performs JPEG compression on the YUV image data to obtain JPEG-compressed image data. The image data being obtained may be stored in any desired memory such as the SDRAM 30.

Still referring to FIG. 7, the digital camera 101 further includes an LCD driver 60, a video amplifier (AMP) 61, a video jack 62, a USB connector 63, a serial driver circuit 64, an RS 232C connector 65, a SUB CPU 66, a sub LCD 67, a buzzer 68, the remote controller receiver 69, and an LCD driver 70.

The LCD driver 60 may be implemented by a drive circuit, which drives the LCD 23. For example, the LCD driver 60 converts the video signal output from the TV signal display block 58 to a signal to be displayed on the LCD 23.

The video AMP 61 converts the video signal output from the TV signal display block 58 to an image signal having the impedance of 75 Ohm, or any desired impedance value that matches the video jack 62. The video jack 62 allows the digital camera 101 to be connected with an external display device such as the TV.

The USB connector 63 allows USB connection between the digital camera 101 and an external device such as the personal computer. The RS 232C connector 65 allows serial communication between the digital camera 101 and an external device such as the personal computer. In this example, the serial driver circuit 64 performs electric voltage conversion on the signal output by the serial block 55 such that the signal having a desired voltage is input to the RS 232C connector 65.

The SUB CPU 66 may be implemented by a CPU provided with a ROM and a RAM on which the CPU, the ROM, and the RAM is mounted onto one chip. For example, the SUB CPU 66 outputs a user instruction, which may be input through the operation unit SW including the release shutter button SW1, the mode dial SW2, and the buttons SW3 to SW12 and 24, and the signal output from the remote controller receiver 69, to the CPU 52. In another example the SUB CPU 66 receives status information regarding the status of the digital camera 101, which may be received from the CPU 52, and generates a control signal based on the status information to be output to a desired device such as at least one of the sub LCD 67, AF LED 21, flash LED 22, and buzzer 68.

The sub LCD 67 may function as a display device, which displays supplementary information such as information regarding the total number of images that can be taken by the digital camera 101. The LCD driver 70 may be implemented by a drive circuit, which drives the sub LCD 67 according to the output signal received from the SUB CPU 66.

The digital camera 101 may further include a voice recording unit including a microphone 71a, a microphone amplifier (AMP) 71b, and a voice recording circuit 71c, a voice playing unit including a speaker 72a, an audio 72b, and a voice playing circuit 72c, and a communication circuit 73.

The microphone 71a allows the user to input a voice as a voice signal. The microphone AMP 71b amplifies the voice signal input by the user through the microphone 71a. The voice recording circuit 71c stores the voice signal in any desired memory. The voice play circuit 72c converts the voice signal, which has been recorded by the voice recoding circuit 71c, to a voice signal to be output through the speaker 72a. The audio AMP 72b amplifies the voice signal being converted and to be output through the speaker 72a. The speaker 72a outputs the voice signal.

The communication circuit 73 allows communication between the digital camera 101 and an external device. For example, the communication circuit 73 may be implemented by a Bluetooth circuit, which allows connection between the digital camera 101 and a Bluetooth compliant device. Alternatively, the digital camera 101 may connect with the Bluetooth compliant device without using the communication circuit 73, for example, using a Bluetooth card being inserted to the slot 34. In another example, the communication circuit 73 may be implemented by an Ethernet circuit, which allows wired or wireless connection between the digital camera 101 and an Ethernet compliant device. Alternatively, the digital camera 101 may connect with the Ethernet compliant device without using the communication circuit 73, for example, using the LAN card being inserted to the slot 34.

The digital camera 101 may further include a flash lighting unit 74 that causes a flash to be lighted, and a flash circuit 75 that causes the flash lighting unit 74 to light the flash.

The digital camera 101 may further include an object distance measuring unit 76, which provides information regarding the object distance between an object and the digital camera 101.

In one example, the digital camera 101 may allow the user to focus an object manually. In such case, the user points the digital camera 101 such that an object area to be focused is put in the center of the screen displayed by the LCD 23, and presses the release shutter button SW1 halfway. In order to take an image of the object while focusing the object area, the user further presses the release shutter button SW1 all the way. Taking the image in this manner may be difficult especially for less experienced users such that the resultant image may be out of focus.

In view of the above, the digital camera 101 illustrated in FIG. 6 or 7 is provided with the focus bracket function, which consecutively captures a plurality of images of the same object while changing the focal length of the optical system, and automatically selects the mostly focused image from the plurality of images being captured. For example, when the focus bracket mode is selected by the user and the shutter release button SW1 is pressed, the digital camera 101 automatically takes a plurality of images of the same object while changing the focal length of the optical system for each image. The selection of the focus bracket mode may be made by selecting the recording mode through the mode dial SW2, and selecting the focus bracket mode through the menu button SW6.

More specifically, when the shutter release button SW1 is pressed all the way while the focus bracket mode is selected, the CPU 52 instructs the motor driver 29 to drive the focus drive motor 26b at different motor pulses such that the resultant images being captured by the optical system have different focal lengths based on the corresponding different motor pulses. The plurality of images being taken are stored in the SDRAM 30. The CPU 52 automatically selects the mostly focused image from the plurality of images being stored in the SDRAM 30, for example, based on an evaluation value for each image that indicates how much an object area, which may be selected by the user, is in focus. The selected image may be displayed on the LCD 23.

Further, in this example, the evaluation values for the plurality of images are compared while compensating for the shift in the position of the object area among the plurality of images. In one example, the position of the object area may be shifted due to the structural change in optical system such as the change in focal length. In another example, the position of the object area may be shifted due to the positional change of the optical system with respect to the object area, such as due to the movement of the user's hand holding the digital camera 101.

Figure 8:
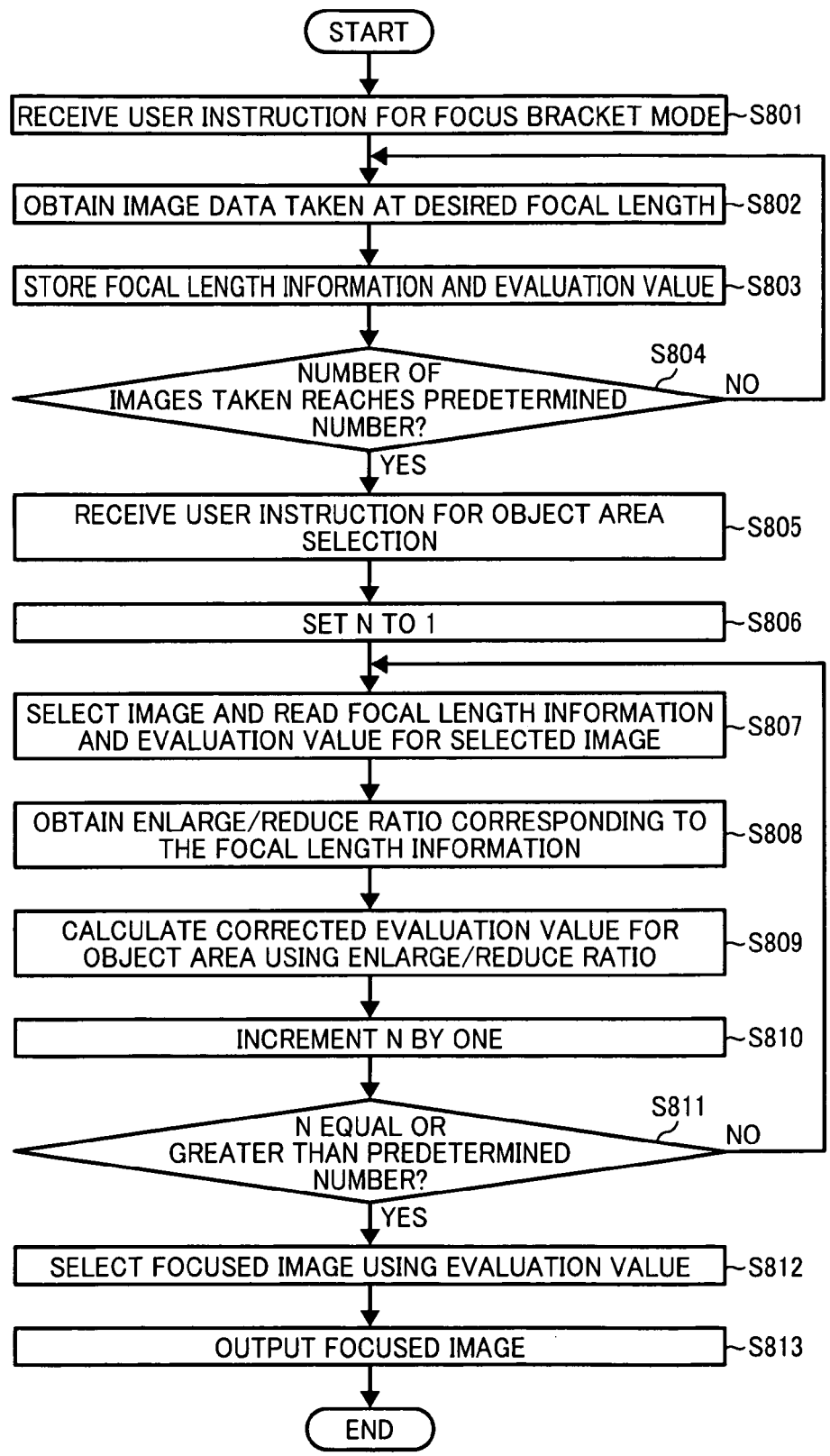
FIG. 8 is a flowchart illustrating operation of selecting a mostly focused image, performed by the digital camera shown in FIG. 6, according to an example embodiment of the present invention.

Referring now to FIG. 8, operation of selecting a mostly focused image while compensating for the shift in the position of the object area, which is caused due to the change in focal length of the optical system, is explained according to an example embodiment of the present invention. The operation of FIG. 8 may be performed by the CPU 52, for example, when the focus bracket mode is selected by the user through the operation unit SW. More specifically, the CPU 52 performs the operation of FIG. 8 according to an image processing control program stored in the ROM 31, which may be executed upon selection of the focus bracket mode.

At S801, the CPU 52 receives a user instruction for selecting the focus bracket mode, for example, from the operation unit SW through the SUB CPU 66.

At S802, the CPU 52 sets a desired focal length, and causes the optical system to capture an image of the object using the desired focal length by causing the focus motor 26b to drive at the motor pulse value corresponding to the desired focal length. The desired focal length may be previously set by default or according to the user preference. The image being captured by the optical system may be stored in the SDRAM 30 as image data under control of the CPU 52.

At S803, the CPU 52 stores information regarding the shooting condition, which is obtained together with the captured image, in the SDRAM 30. In this example, the CPU 52 may obtain information regarding the focal length for the image being taken, and the evaluation value such as the AF value being calculated for the image being taken. In one example, the CPU 52 may obtain information regarding the focal length from the optical system as the shooting condition. Alternatively, the CPU 52 may obtain information regarding the focal length at the time when the desired focal length is set at S802. In this example, the number of pulses of the focus motor 26b is used as the information regarding the focal length. The evaluation value, such as the AF value, may be obtained by the CPU 52, for example, by applying the high pass filter or the band-pass filter to the image signal output by the CCD 40 as described above referring to FIG. 4.

At S804, the CPU 52 determines whether the number of images being taken is equal to or greater than a predetermined number, which is previously set by default or according to the user preference. When it is determined that the number of images being taken reaches the predetermined number ("YES" at S804), the operation proceeds to S805. When it is determined that the number of images being taken does not reach the predetermined number ("NO" at S804), the operation returns to S802 to repeat S802 to S804. In this example, five images 3 to 7, as illustrated in FIG. 1, are assumed to be obtained while varying the focal length.

At S805, the CPU 52 receives information regarding an object area to be focused, which may be input through the operation unit SW as a user instruction and received through the SUB CPU 66. For example, the user may select the object area using any one of the buttons SW7 to SW10, for example, by defining at least two points that are diagonal. Based on the points that are diagonal, the evaluation area such as the square 8 of any one of FIGS. 2A, 2B, 3A, and 3B may be defined.

At S806, the CPU 52 sets a number of processed images N to 1.

At S807, the CPU 52 selects an image to be processed as a selected image, and reads out information regarding the focal length of the selected image such as the number of motor pulses ("the motor pulse value") for the selected image, and the evaluation value such as the AF value of the selected image, from the SDRAM 30.

At S808, the CPU 52 obtains the enlarge/reduce ratio that corresponds to the motor pulse value that is obtained at S807 for the selected image, from the table of FIG. 5, which stores the motor pulse value and the corresponding enlarge/reduce ratio. The table of FIG. 5 may be stored in any desired memory of the digital camera 101.

At S809, the CPU 52 corrects the evaluation value such as the AF value obtained at S807 using the enlarge/reduce ratio obtained at S808 as a corrected evaluation value. Further, in this example, the corrected evaluation value is obtained for the evaluation area corresponding to the object area being selected by the user at S805.

At S810, the CPU 52 increments the number of processed image N by one such that the number of processed image is N+1.

At S811, the CPU 52 determines whether the number of processed images N is equal to or greater than the predetermined number, which is previously set by default or according to the user preference as the total number of images being taken for the same object. When it is determined that the number of processed images N is equal to or greater than the predetermined number ("YES" at S811), the operation proceeds to S812. When it is determined that the number of processed images N is less than the predetermined number ("NO" at S8 11), the operation returns to S807 to repeat S807 to S811 for an image to be selected next.

At S812, the CPU 52 compares the corrected evaluation values for the plurality of images being taken, and selects one image having the mostly focused object area, or the mostly focused evaluation area, as a mostly focused image. In this example, the image having the highest AF value is selected as the mostly focused image.

At S813, the CPU 52 outputs the mostly focused image, and the operation ends. For example, the CPU 52 may cause the LCD 23 to display the mostly focused image. Further, the CPU 52 may store the mostly focused image in the internal memory 33 or the external memory 35 being inserted into the slot 34. At this time, the images being taken together with the mostly focused image may be deleted.

As described above referring to FIG. 8, since the evaluation value is corrected so as to compensate the shift value that is generated due to the change in focal length of the optical system, the digital camera 101 can automatically select the mostly focused image with high accuracy.

The operation of FIG. 8 may be performed in various other ways. For example, the shift in the position of the object area does not have to be corrected for all of the plurality of images, which is consecutively taken for the same object. For example, one image, which may be selected from the plurality of images, may be set to be a reference image. In such case, the evaluation value obtained for the reference image does not have to be corrected, as the shift value is 0. For example, when the number of images being taken is set to 9, the fifth image, which is position in the middle, may set as the reference image. The shift value for any one of the other images may be calculated with respect to the reference image.

Figure 9:
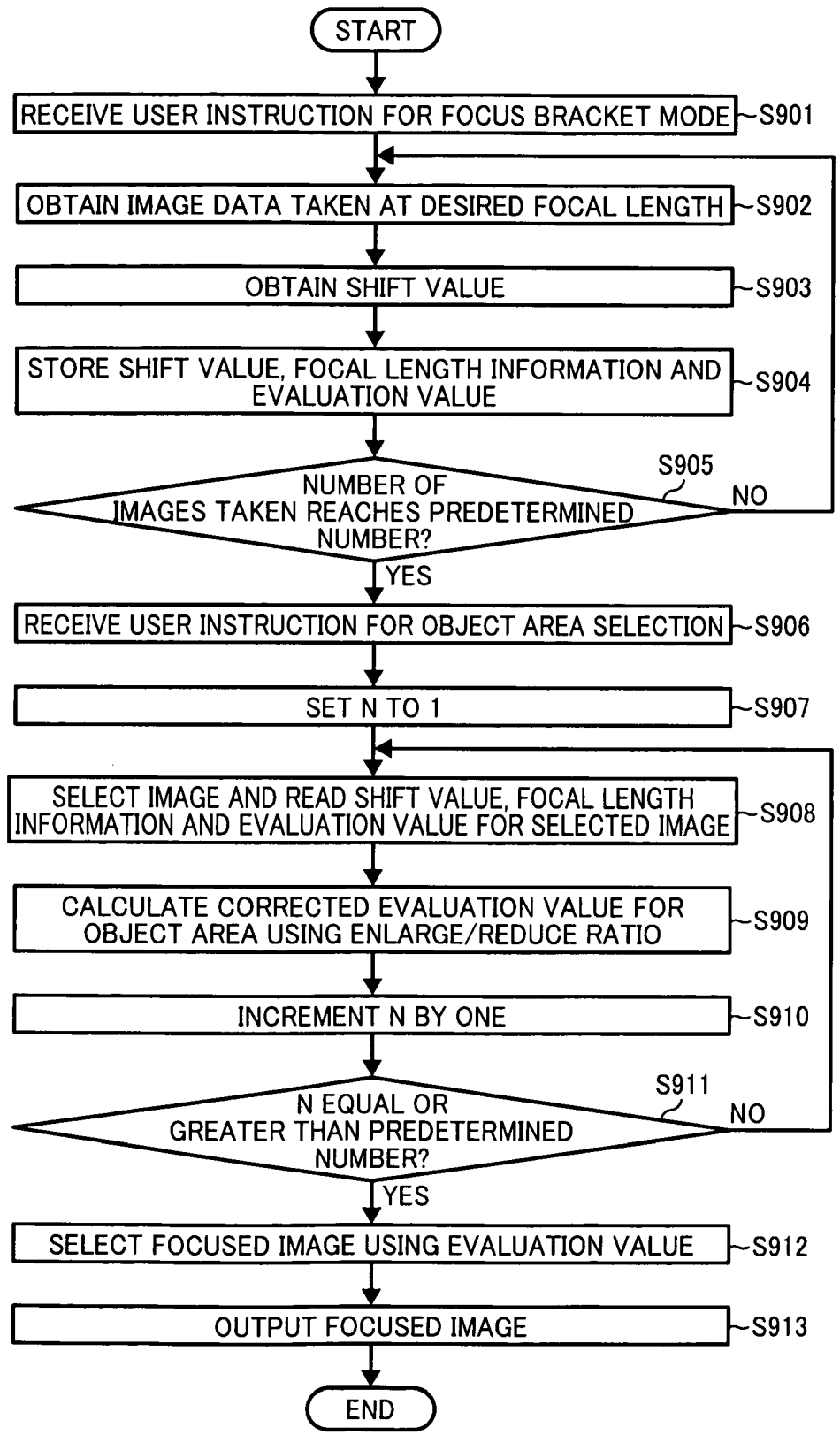
FIG. 9 is a flowchart illustrating operation of selecting a mostly focused image, performed by the digital camera shown in FIG. 6, according to an example embodiment of the present invention.

Referring now to FIG. 9, operation of selecting a mostly focused image while correcting the shift in the position of the object area, which is caused due to the change in position of the optical system with respect to the object, performed by the digital camera 101, is explained according to an example embodiment of the present invention. The operation of FIG. 9 may be performed by the CPU 52, when the focus bracket mode is selected by the user, through the operation unit. More specifically, the CPU 52 performs the operation of FIG. 9 according to an image processing control program stored in the ROM 31, which may be executed upon selection of the focus bracket mode.

At S901, the CPU 52 receives a user instruction for selecting the focus bracket mode in a substantially similar manner as described above referring to S801 of FIG. 8.

At S902, the CPU 52 obtains an image of the object, which is captured by the optical system using a desired focus length, in a substantially similar manner as described above referring to S802 of FIG. 8.

At S903, the CPU 52 obtains the shift value indicating how much the object area, or the object, in the image is shifted with respect to a reference image. In this example, the CPU 52 of the digital camera 101 is provided with a motion detecting circuit, which is capable of detecting the shift value of the image being obtained at S902, with respect to a reference image.

At S904, the CPU 52 stores the shift value obtained at S903, information regarding the focal length of the image, and the evaluation value such as the AF value of the image, in the SDRAM 30. The information regarding the focal length and the evaluation value may be obtained in a substantially similar manner as described above referring to S803 of FIG. 8.

At S905, the CPU 52 determines whether the number of images being taken reaches a predetermined number, which is previously set by default or according to the user preference, in a substantially similar manner as described above referring to S804 of FIG. 8. When it is determined that the number of images being taken reaches the predetermined number ("YES" at S905), the operation proceeds to S906. When it is determined that the number of images being taken does not reach the predetermined number ("NO" at S905), the operation returns to S902 to repeat S902 to S905.

At S906, the CPU 52 receives information regarding an object area to be focused, which may be input through the operation unit SW as a user instruction and received through the SUB CPU 66, in a substantially similar manner as described above referring to S805 of FIG. 8. Based on the user instruction, the CPU 52 may define the evaluation area.

At S907, the CPU 52 sets a number of processed images N to 1.

At S908, the CPU 52 selects an image to be processed as a selected image, and reads out the shift value of the selected image, information regarding the focal length of the selected image such as the number of motor pulses ("the motor pulse value") for the selected image, and the evaluation value such as the AF value of the selected image, from the SDRAM 30.

At S909, the CPU 52 corrects the evaluation value such as the AF value obtained at S807 using the shift value obtained at S807 as a corrected evaluation value. Further, in this example, the corrected evaluation value is obtained for the evaluation area corresponding to the object area being selected by the user at S906.

At S910, the CPU 52 increments the number of processed image N by one such that the number of processed image is N+1.

At S911, the CPU 52 determines whether the number of processed images N is equal to or greater than the predetermined number, which is previously set by default or according to the user preference as the total number of images being taken for the same object, in a substantially similar manner as described above referring to S811 of FIG. 8. When it is determined that the number of processed images N is equal to or greater than the predetermined number ("YES" at S911), the operation proceeds to S912. When it is determined that the number of processed images N is less than the predetermined number ("NO" at S911), the operation returns to S908 to repeat S908 to S911 for an image to be selected next.

At S912, the CPU 52 compares the corrected evaluation values for the plurality of images being taken, and selects one image having the mostly focused object area, or the mostly focused evaluation area, as a mostly focused image. In this example, the image having the highest AF value is selected as the mostly focused image.

At S913, the CPU 52 outputs the mostly focused image, and the operation ends. For example, the CPU 52 may cause the LCD 23 to display the mostly focused image. Further, the CPU 52 may store the mostly focused image in the internal memory 33 or the external memory 35 being inserted into the slot 34. At this time, the images being taken together with the mostly focused image may be deleted.

As described above referring to FIG. 9, since the evaluation value is corrected so as to compensate the shift value that is generated due to the change in position of the optical system with respect to the object, the digital camera 101 can automatically select the mostly focused image with high accuracy.

For example, it is assumed that, when taking 16 images using the digital camera 101 for 2 seconds, and the shift value of 15% is observed for the image having the highest shift value. Assuming that the image has the horizontal resolution of 3072 pixels, the shift value of 15% would result in the shift value of about 460 pixels. Even when the shift value that is relatively high is obtained, the digital camera 101 is able to select the mostly focused image with high accuracy.

The operation of FIG. 9 may be performed in various other ways. For example, S903 of obtaining the shift value may be performed by the CPU 52, which is not provided with the motion detecting circuit. More specifically, as long as the CPU 52 is provided with the function of pattern matching and the function of size reduction, each of which is usually provided as the basic function, the CPU 52 may obtain the shift value.

For example, the CPU 52 may be provided with a reduced-size image generating circuit, a pattern matching applying circuit, a shift value obtaining circuit, and a process control circuit. The reduced-size image generating circuit generates a plurality of reduced-size images from each one of the plurality of images being taken, each having the different reduction ratio that may be set by the process control circuit. The process control circuit may set at least one reduced-size image to a first image and a second image, with the second image being shifted by a predetermined value with respect to the first image. The pattern matching applying circuit applies pattern matching to specify a portion of the first image having a pattern substantially similar to the pattern contained in a selected portion of the second image to generate a detection result. The shift value obtaining circuit obtains the shift value, which is caused due to the position of the optical system, using the detection result. In this example, the process control circuit may control the pattern matching applying circuit to generate more than one detection result using more than one reduced-size image. When more than one detection result is obtained, the shift value obtaining circuit may select one of the detection results to be used for obtaining the shift value.

Figure 10:
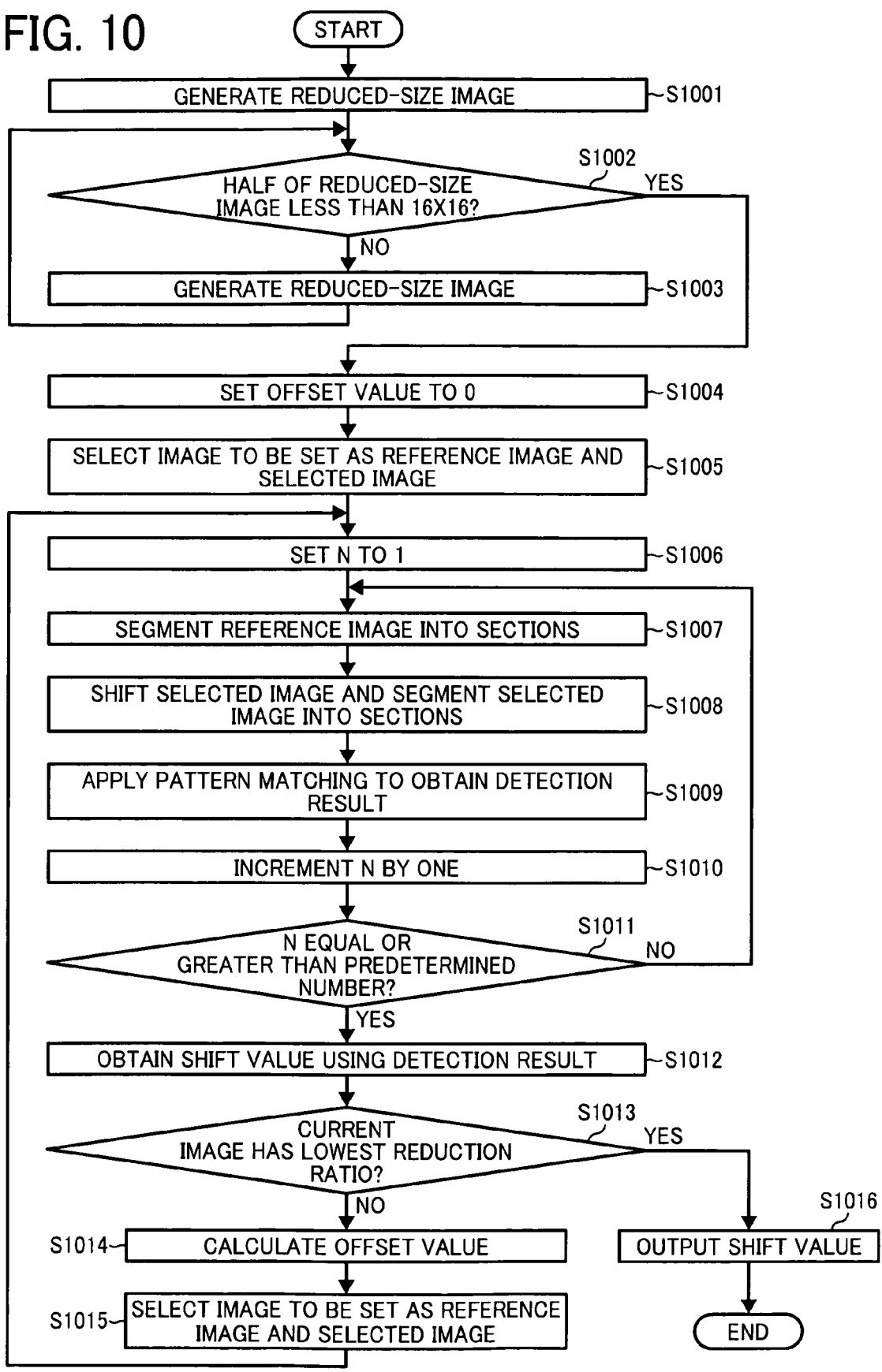
FIG. 10 is a flowchart illustrating operation of obtaining the shift value of an image, performed by the digital camera shown in FIG. 6, according to an example embodiment of the present invention.

Referring now to FIG. 10, operation of detecting the shift value using pattern matching function and size reduction function is explained according to an example embodiment of the present invention.

At S1001, the CPU 52 reduces the size of the original image by a desired reduction ratio to generate a reduced-size image. In this example, the desired reduction ratio may be determined based on the desired level of accuracy in detecting the shift value. For example, the reduction ratio may be set so as to have the image size of 320 pixels by 240 pixels with respect to the original image having the image size of 640 pixels by 480 pixels.

At S1002, the CPU 52 determines whether the half image size of the size of the reduced-size image is equal to or less than the image size of 16 pixels by 16 pixels. When it is determined that the half of the reduced-size image is greater than 16 pixels by 16 pixels ("NO" at S1002), the operation proceeds to S1003 to further generate a reduced-size image, which is smaller in size than the current reduced-size image. When it is determined that the half of the reduced-size image is equal to or less than 16 pixels by 16 pixels ("YES" at S1002), the operation proceeds to S1004.

At S1004, for each reduced-sized image, the CPU 52 sets the offset value to be 0. In this example, the offset value includes an X offset value and a Y offset value. The X offset value is the difference of a selected pixel contained in the reduced-size image with respect to a reference point in one direction X. The Y offset value is the difference of a selected pixel contained in the reduced-size image with respect to the reference point in the direction Y that is perpendicular to the direction X.

At S1005, the CPU 52 sets the reduced-size image having the largest reduction ratio with respect to the original image size to be a reference image and a selected image.

At S1006, the CPU 52 sets a number N of which pattern matching is performed in each image to 1.

At S1007, the CPU 52 segments the reference image into a plurality of sections, with each section having the data size of 8 pixels by 8 pixels.

At S1008, the CPU 52 shifts the selected image by the offset value X in the direction X, and by the offset value Y in the direction Y. The CPU 52 further segments the selected image, which has been shifted, into a plurality of sections with each section having the data size of 4 pixels by 4 pixels.

At S1009, the CPU 52 applies pattern matching to specify one section from the sections of 8 pixels by 8 pixels in the reference image, which matches a selected section of the sections of 4 pixels by 4 pixels in the selected image. The set of section in the reference image that matches the section in the selected image may be obtained as a detection result.

At S1010, the CPU 52 increments the number N of which pattern matching is performed by one.

At S1011, the CPU 52 determines whether the number N of which pattern matching is performed is equal to or greater than a predetermined number, which may be previously set by default or according to the use preference. When it is determined that the number N of which pattern matching is performed is equal to or greater than the predetermined number ("YES" at S1011), the operation proceeds to S1012. When it is determined that the number N of which pattern matching is performed is less than the predetermined number ("NO" at S1011), the operation returns to S1007 to repeat S1007 to S1010. In this example, the predetermined number, which defines the number N, is set to 3.

At S1012, the CPU 52 obtains the shift value for each image being obtained by the digital camera 101 for the same object, using the detection result obtained at S1009. The detection result obtained at S1009 indicates that the section of the reference image that is selected as the section that matches the section of the selected image. The shift value may be obtained as the distance between the section of the reference image and the section of the selected image.

In this example, the detection results are obtained for the predetermined number for defining the number N. As long as the section that is used for pattern matching remains the same, the detection results may each indicate the same section of the reference image as the section that matches the selected section of the selected image. Thus, the shift value for each detection result may be the same. However, in some cases, the detection results obtained at S1009 may be different such that the section of the reference image obtained as the section that matches the selected section of the selected image may be different.

In order to take account such example cases, the CPU 52 may determine whether all detection results obtained for the predetermined number N indicate the same result. When at least two of the detection results are different, the CPU 52 may select the detection result to be used for obtaining the shift value, which indicates the same result as a majority of the detection results being obtained indicates.

At S1013, the CPU 52 determines whether the current image being processed, which is set as the reference image and the selected image at S1005, is the image having the lowest reduction ratio of the plurality of reduced-size images being obtained. When it is determined that the current image is not the image having the lowest reduction ratio ("NO" at S1013), the operation proceeds to S1014. When it is determined that the current image is the image having the lowest reduction ratio ("YES" at S1013), the operation proceeds to S1016.

At S1014, the CPU 52 calculates the offset value including the X offset value and the Y offset value, using the shift value obtained at S1012.

At S1015, the CPU 52 sets the image having the reduction ratio that is lower than the current image by one step to be the reference image and the selected image, and returns to S1006 to repeat S1006 to S1014.

At S1016, the CPU 52 outputs the shift value obtained at S1012, and the operation ends. In this example, the shift value to be output at S1016 may correspond to the shift value obtained for the image having the lowest reduction ratio.

As described above referring to FIG. 10, the CPU 52 is capable of detecting the shift value even when the motion detection circuit is not provided.

Referring back to FIG. 4, the CPU 52 of the digital camera 101 may be further provided with an object distance obtaining circuit, which functions as the object distance obtaining device 15 which obtains the object distance indicating the distance between the object 2 and the digital camera 101. Since it is assumed that the object distance obtained from the mostly focused image reflects the actual object distance with high accuracy, the object distance from the mostly focused image may be used for further processing. For example, using the object distance, the background section of the image may be blurred with respect to the foreground section of the image that includes the object 2. In another example, using the object distance, white balancing may be differently applied to the background section and the foreground section.

Figure 11:
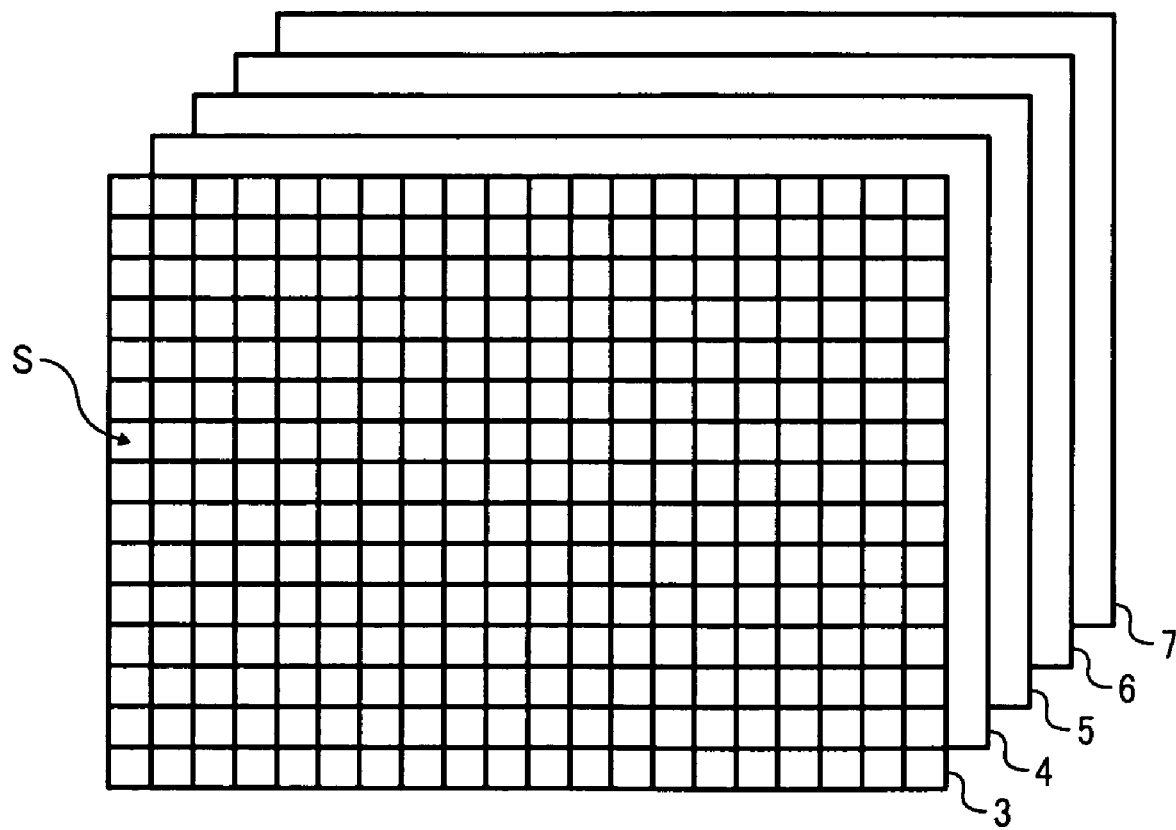
FIG. 11 is an illustration for explaining segmenting an image into a plurality of sections, according to an example embodiment of the present invention.

More specifically, in this example, the CPU 52 may generate an object distance map, which includes information regarding the object distance between a selected object area 1 of the object 2 and the digital camera 101 using the mostly focused image that is selected for the selected object area 1. As illustrated in FIG. 11, each image may be segmented into a plurality of sections S, with section S being set as the object area 1. The CPU 52 may obtain the object distance for each of the plurality of sections S, and generate an object distance map including information regarding the object distance obtained for each of the plurality of sections S.

Figure 12:
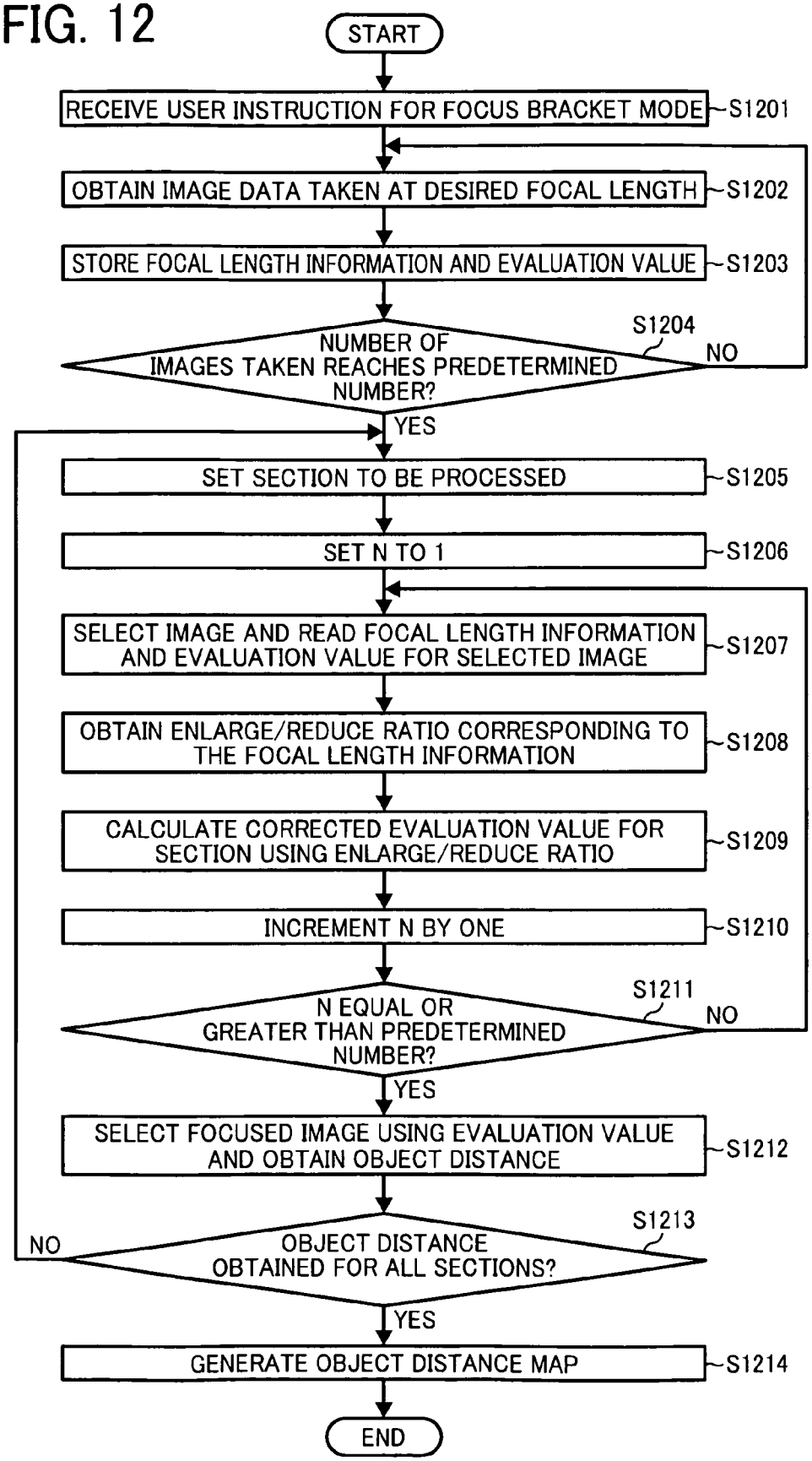
FIG. 12 is a flowchart illustrating operation of generating an object distance map, performed by the digital camera shown in FIG. 6, according to an example embodiment of the present invention.

Referring now to FIG. 12, operation of generating a distance map while compensating for the shift in the position of the object area, which is caused due to the change in focal length of the optical system, performed by the digital camera 101, is explained according to an example embodiment of the present invention. The operation of FIG. 12 may be performed by the CPU 52, for example, when the focus bracket mode is selected by the user through the operation unit SW. More specifically, the CPU 52 performs the operation of FIG. 12 according to an image processing control program stored in the ROM 31, which may be executed upon selection of the focus bracket mode.

S1201 to S1203 may be performed by the CPU 52 in a substantially similar manner as described above referring to S801 to S804 of FIG. 8.

When it is determined that the number of images being taken reaches the predetermined number at S1204 ("YES" at S1204), the operation proceeds to S1205 to set an evaluation area in which the corresponding object distance is not obtained as an evaluation area to be processed. In this example, the evaluation area may be any one of the plurality of section S illustrated in FIG. 11.

When the evaluation area to be processed is set at S1205, the operation proceeds to S1206 to perform S1206 to S1211 in a substantially similar manner as described above referring to S806 to S811 of FIG. 8. The differences include the evaluation area to be processed. In the example case illustrated in FIG. 8, the evaluation area is set according to a user instruction for specifying an object area. In this example illustrated in FIG. 12, the evaluation area is arbitrarily set, one by one, by the CPU 52 to be one of the plurality of sections S such that all of the plurality of sections S will be processed.

At S1212, the CPU 52 compares the corrected evaluation values for the plurality of images being taken, selects one image having the mostly focused evaluation area as a mostly focused image, and obtains the focal length of the mostly focused image as an object distance indicating the distance between the digital camera 101 and the object area of the object 2 that corresponds to the selected evaluation area.

At S1213, the CPU 52 determines whether the object distance has been obtained for all evaluation areas, or all of the plurality of section S, obtainable from the image. When it is determined that the object distance has not been obtained for all evaluation areas ("NO" at S1213), the operation returns to S1205 to repeat S1205 to S1213. When it is determined that the object distance has been obtained for all evaluation areas ("YES" at S1213), the operation proceeds to S1214.

At S1214, the CPU 52 generates an object distance map, which includes information regarding the object distance being obtained for each evaluation area, or each section S of FIG. 11. The CPU 52 may output the object distance map to the LCD 23 for display to the user.

As described above referring to FIG. 12, since the mostly focused image can be selected with high accuracy as described above referring to FIG. 8, the digital camera 101 can obtain the object distance with high accuracy using the mostly focused image even when there is a shift caused due to the change in focal length of the optical system.

Figure 13:
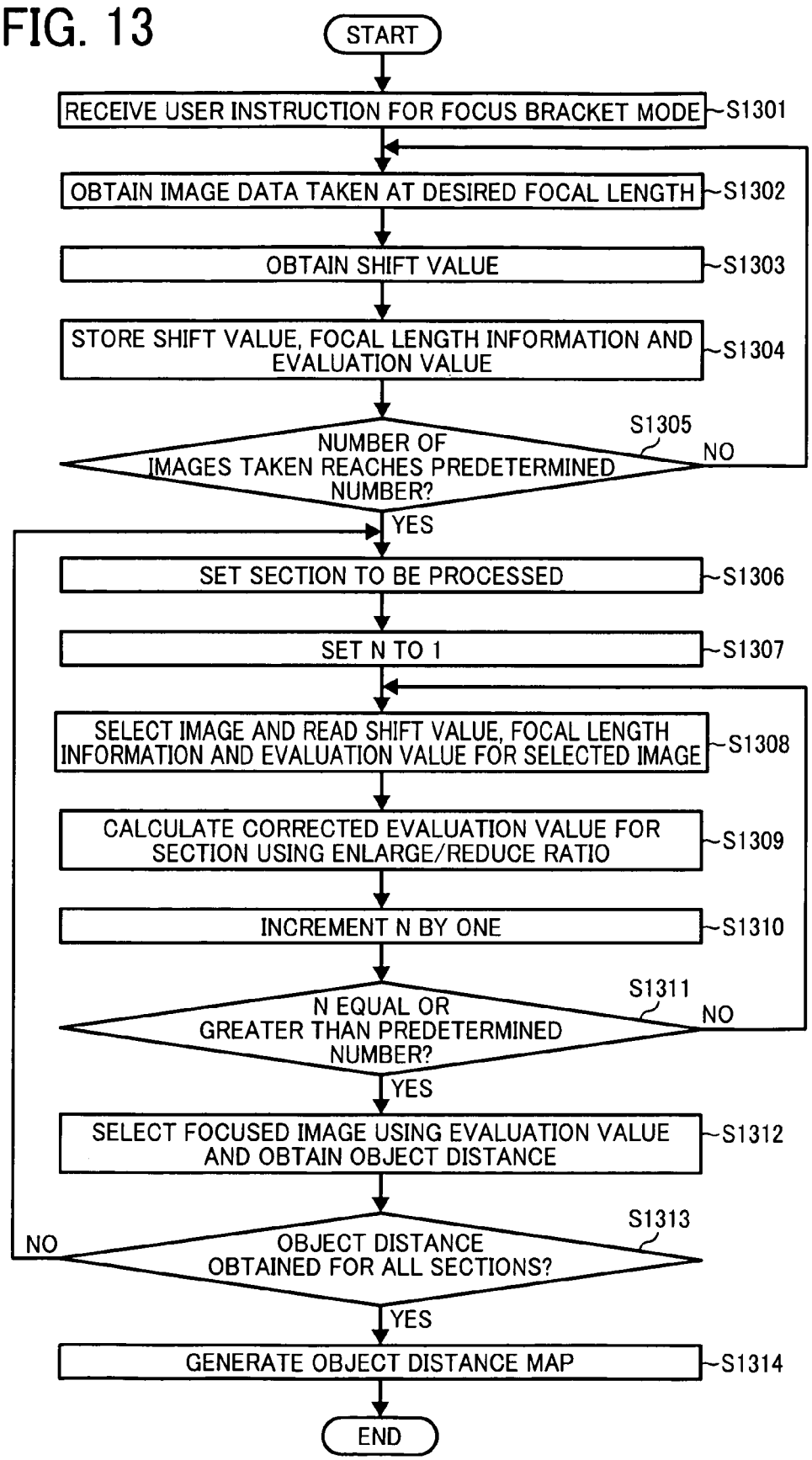
FIG. 13 is a flowchart illustrating operation of generating an object distance map, performed by the digital camera shown in FIG. 6, according to an example embodiment of the present invention.

The operation of FIG. 13 may be performed in various other ways. For example, in alternative to S1214 of generating an object distance map, the digital camera 101 may use the obtained object distance for other image processing such as white balance adjustment.

Referring now to FIG. 13, operation of generating a distance map while compensating for the shift in the position of the object area, which is caused due to the change in position of the optical system with respect to the object, performed by the digital camera 101, is explained according to an example embodiment of the present invention. The operation of FIG. 13 may be performed by the CPU 52, for example, when the focus bracket mode is selected by the user through the operation unit SW. More specifically, the CPU 52 performs the operation of FIG. 13 according to an image processing control program stored in the ROM 31, which may be executed upon selection of the focus bracket mode.

S1301 to S1305 may be performed by the CPU 52 in a substantially similar manner as described above referring to S901 to S905 of FIG. 9.

When it is determined that the number of images being taken reaches the predetermined number at S1305 ("YES" at S1305), the operation proceeds to S1306 to set an evaluation area in which the corresponding object distance is not obtained as an evaluation area to be processed. In this example, the evaluation area may be any one of the plurality of section S illustrated in FIG. 11.

When the evaluation area to be processed is set at S1306, the operation proceeds to S1307 to perform S1307 to S1311 in a substantially similar manner as described above referring to S907 to S911 of FIG. 9. The differences include the evaluation area to be processed. In the example case illustrated in FIG. 9, the evaluation area is set according to a user instruction for specifying an object area. In this example illustrated in FIG. 13, the evaluation area is arbitrarily set, one by one, by the CPU 52 to be one of the plurality of sections S such that all of the plurality of sections S will be processed.

At S1312, the CPU 52 compares the corrected evaluation values for the plurality of images being taken, selects one image having the mostly focused evaluation area as a mostly focused image, and obtains the focal length of the mostly focused image as an object distance indicating the distance between the digital camera 101 and the object area of the object 2 that corresponds to the selected evaluation area.

At S1313, the CPU 52 determines whether the object distance has been obtained for all evaluation areas, or the plurality of sections S, obtainable from the image. When it is determined that the object distance has not been obtained for all evaluation areas ("NO" at S1313), the operation returns to S1306 to repeat S1306 to S1312. When it is determined that the object distance has been obtained for all evaluation areas ("YES" at S1313), the operation proceeds to S1314.

At S1314, the CPU 52 generates an object distance map, which includes information regarding the object distance being obtained for each evaluation area, or each section S of FIG. 11. The CPU 52 may output the object distance map to the LCD 23 for display to the user.

As described above referring to FIG. 13, since the mostly focused image can be selected with high accuracy as described above referring to FIG. 9, the digital camera 101 can obtain the object distance with high accuracy using the mostly focused image even when there is a shift caused due to the change in position of the optical system with respect to the object.

The operation of FIG. 13 may be performed in various other ways. For example, S1303 of obtaining the shift value may be performed by the CPU 52 in a substantially similar manner as described above referring to FIG. 10, without using the motion detection circuit.

Further, in alternative to S1314 of generating an object distance map, the digital camera 101 may use the obtained object distance for other image processing such as white balance adjustment.

Numerous additional modifications and variations are possible in light of the above teachings. It is therefore to be understood that within the scope of the appended claims, the disclosure of the present invention may be practiced otherwise than as specifically described herein.

With some embodiments of the present invention having thus been described, it will be obvious that the same may be varied in many ways. Such variations are not to be regarded as a departure from the spirit and scope of the present invention, and all such modifications are intended to be included within the scope of the present invention.

For example, elements and/or features of different illustrative embodiments may be combined with each other and/or substituted for each other within the scope of this disclosure and appended claims.

In one example, rather than automatically selecting the mostly focused image based on the evaluation value while compensating for the shift in the object area among a plurality of images, the digital camera 101 of FIG. 6 may cause the user to select an image by displaying the plurality of images in the LCD 23. In such case, the corrected evaluation value for each image may be shown on the LCD 23. In this manner, the user may be able to select the best-shot image based on sight in addition to the evaluation value. The user may instruct the digital camera 101 to select one image through the operation unit SW for further processing or storage in any desired memory.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, involatile memory cards, ROM (read-only-memory), etc.

Alternatively, any one of the above-described and other methods of the present invention may be implemented by ASIC, prepared by interconnecting an appropriate network of conventional component circuits or by a combination thereof with one or more conventional general purpose microprocessors and/or signal processors programmed accordingly.

What is claimed is:

1. An image processing apparatus, comprising:
a processor; and
a storage device configured to store a plurality of instructions which cause, when executed, the processor to:
input a plurality of images of an object, the plurality of images being consecutively captured by an optical system while changing a focal length of the optical system for each image;
obtain, for each image of the plurality of images, an evaluation value indicating how much an object area of the object in each image is focused;
obtain, for each image of the plurality of images, information regarding a shift value indicating the shift in position of the object area of the object in each image with respect to a reference point;
generate a corrected evaluation value, the corrected evaluation value being compensated for the shift value being obtained for each image; and
select an image having a mostly focused object area based on the corrected evaluation value as a mostly focused image.

2. The apparatus of claim 1, wherein the processor is further configured to correct the evaluation value being obtained for each image of the plurality of images using the shift value being obtained for each image of the plurality of images to generate the corrected evaluation value.

3. The apparatus of claim 1, wherein the shift value includes at least one of:
a first shift value that is caused due to the change in focal length of the optical system; and
a second shift value that is caused due to the change in position of the optical system with respect to the object.

4. The apparatus of claim 3, further comprising:
a storage device configured to store information indicating the focal length of the optical system, and information regarding the enlarge/reduce ratio that corresponds to the focal length of the optical system,
wherein the processor is further configured to:
obtain, for each image of the plurality of images, information indicating the focal length of the optical system that is used when capturing each image, as the information regarding the first shift value being obtained for each image;
obtain the information regarding the enlarge/reduce ratio that corresponds to the information regarding the first shift value from the storage device; and
generate the corrected evaluation value using the obtained information regarding the enlarge/reduce ratio.

5. The apparatus of claim 3, wherein the processor includes:
a motion detection circuit configured to detect the second shift value for each image of the plurality of images.

6. The apparatus of claim 3, wherein the processor includes:
a reduced-size image generating circuit configured to generate, for each of the plurality of images, a reduced-size image having the image size smaller than the image size of each image being input by the image input means;
a process control circuit configured to set the reduced-size image to a first image and a second image, with the second image being shifted by a predetermined value with respect to the first image;
a pattern matching applying circuit configured to apply pattern matching to specify a portion of the first image having a pattern substantially similar to a selected portion of the second image to generate a detection result; and
a shift value obtaining circuit configured to obtain the second shift value using the detection result.

7. The apparatus of claim 3, further comprising:
an operation unit configured to obtain a user instruction for defining the object area of the object,
wherein the corrected evaluation value is obtained for the object area being defined by the user instruction.

8. The apparatus of claim 3, wherein the processor includes:
an object distance obtaining circuit configured to obtain an object distance that corresponds to the mostly focused image for further processing.

9. An image processing method performed by an image processing apparatus, the image processing method comprising:
inputting a plurality of images of an object, the plurality of images being consecutively captured by an optical system while changing a focal length of the optical system for each image;
obtaining, for each image of the plurality of images, an evaluation value indicating how much an object area of the object in each image is focused;
obtaining, for each image of the plurality of images, information regarding a shift value indicating the shift in position of the object area of the object in each image with respect to a reference point;
generating a corrected evaluation value, the corrected evaluation value being compensated for the shift value being obtained for each image; and
selecting an image having a mostly focused object area based on the corrected evaluation value as a mostly focused image.

10. The image processing method of claim 9, wherein the shift value includes at least one of:
a first shift value that is caused due to the change in focal length of the optical system; and
a second shift value that is caused due to the change in position of the optical system with respect to the object.

11. The image processing method of claim 10, further comprising:
storing information indicating the focal length of the optical system, and information regarding the enlarge/reduce ratio that corresponds to the focal length of the optical system,
wherein the obtaining, for each image of the plurality of images, information regarding a shift value comprises:
obtaining, for each image of the plurality of images, information indicating the focal length of the optical system that is used when capturing each image, as the information regarding the first shift value being obtained for each image, and wherein the generating a corrected evaluation value comprises:
obtaining the information regarding the enlarge/reduce ratio that corresponds to the information regarding the first shift value being obtained for each image from the storage device; and
generating the corrected evaluation value using the obtained information regarding the enlarge/reduce ratio.

12. The image processing method of claim 10, further comprising:

providing a motion detection circuit in the image processing apparatus, the motion detection circuit being configured to detect the second shift value for each image of the plurality of images.

13. The image processing method of claim 10, further comprising:

providing a processor in the image processing apparatus, the processor being configured to perform the obtaining, for each image of the plurality of images, information regarding a shift value, wherein the obtaining, for each image of the plurality of images, information regarding a shift value comprises:
- generating, for each of the plurality of images, a reduced-size image having the image size smaller than the image size of each image being input;
- setting the reduced-size image to a first image and a second image, with the second image being shifted by a predetermined value with respect to the first image;
- applying pattern matching to specify a portion of the first image having a pattern substantially similar to a selected portion of the second image to generate a detection result; and
- obtaining the second shift value using the detection result.

14. A computer readable medium which stores a plurality of instructions which causes an image processing apparatus to perform an image processing method, the image processing method comprising:

- inputting a plurality of images of an object, the plurality of images being consecutively captured by an optical system while changing a focal length of the optical system for each image;
- obtaining, for each image of the plurality of images, an evaluation value indicating how much an object area of the object in each image is focused;
- obtaining, for each image of the plurality of images, information regarding a shift value indicating the shift in position of the object area of the object in each image with respect to a reference point;
- generating a corrected evaluation value, the corrected evaluation value being compensated for the shift value being obtained for each image; and
- selecting an image having a mostly focused object area based on the corrected evaluation value as a mostly focused image.

15. The recording medium of claim 14, wherein the image processing method further comprises:

providing a motion detection circuit in the image processing apparatus, the motion detection circuit being configured to detect the shift value for each image of the plurality of images.

* * * * *